UNITED STATES PATENT OFFICE.

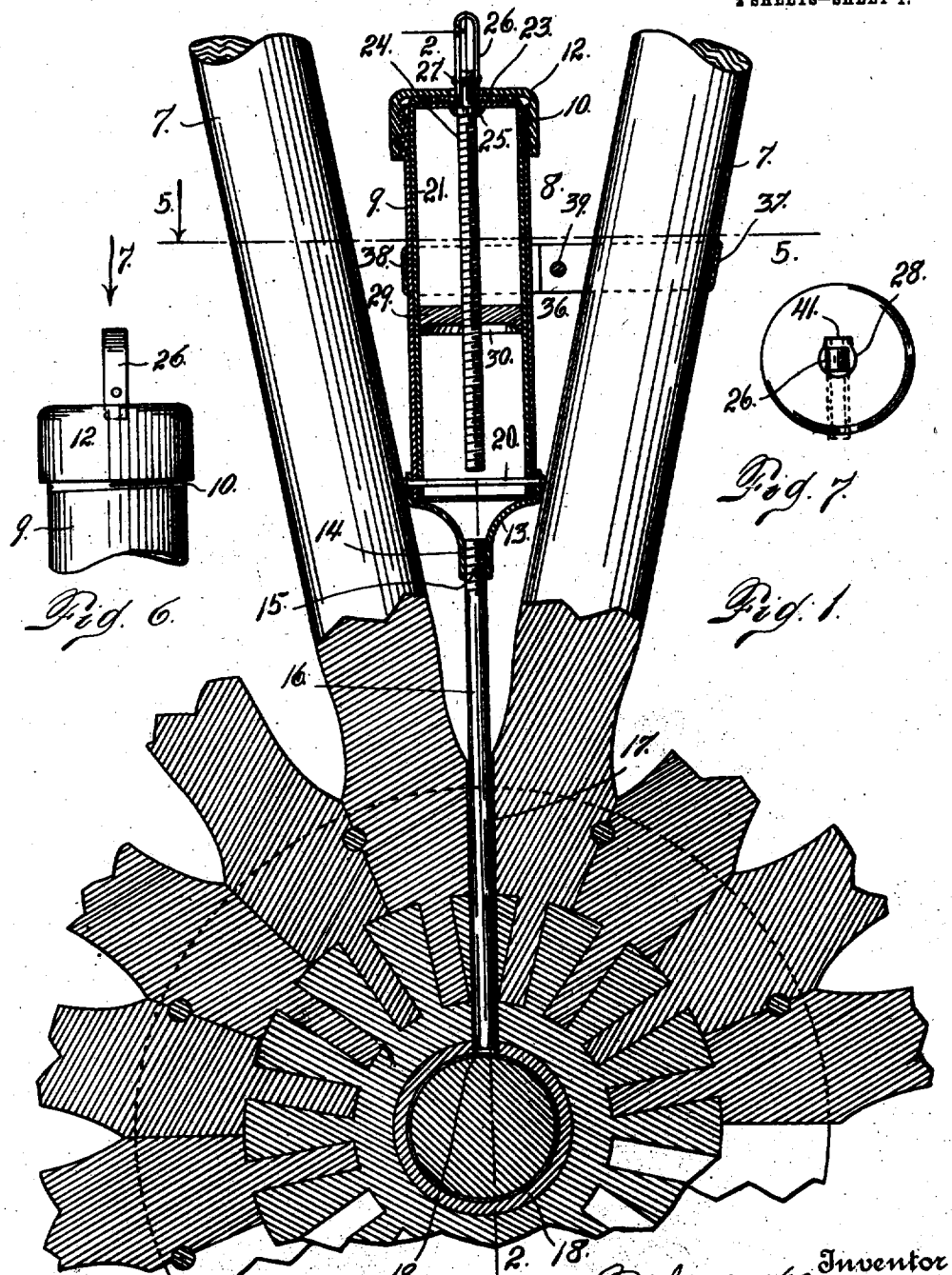

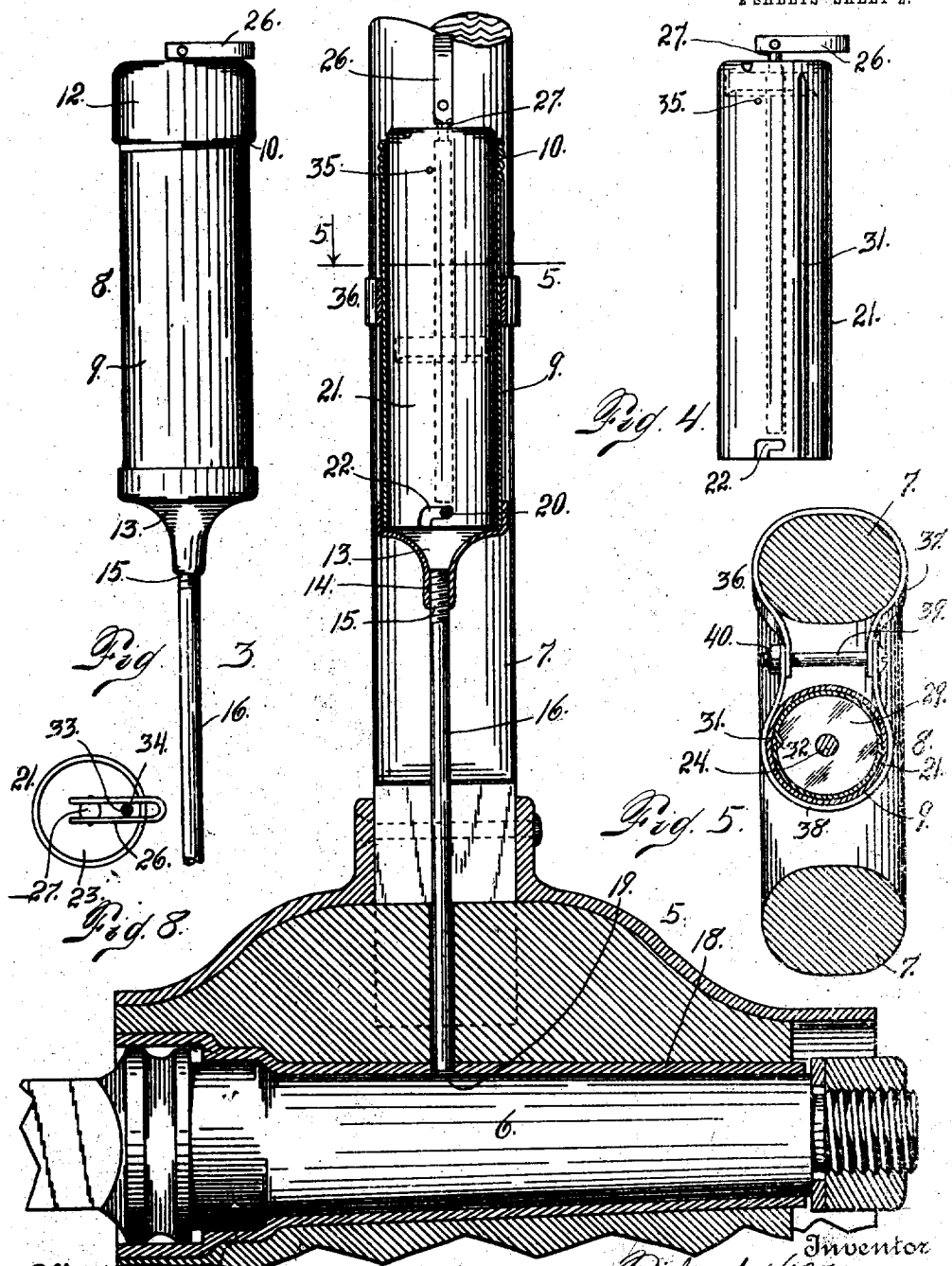

RICHARD H. VESEY, OF DENVER, COLORADO.

JOURNAL-LUBRICATOR.

1,020,167.

Specification of Letters Patent.  Patented Mar. 12, 1912.

Application filed February 9, 1911. Serial No. 607,577.

*To all whom it may concern:*

Be it known that I, RICHARD H. VESEY, a citizen of the United States, residing in the city and county of Denver and State of Colorado, have invented certain new and useful Improvements in Journal-Lubricators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in journal lubricators, my object being to provide a device of this class which while more especially adapted for use in connection with the journals of vehicle axles, may be employed in other relations where journal lubrication is required.

In my improved construction as illustrated in the drawing the lubricant receptacle is interposed between two spokes of a vehicle wheel, the device being secured in place by connecting the outer shell with a spoke of the wheel by a metal strap passed around both the shell and the spoke, a screw being interposed between the two members for tightening the strap sufficiently to hold the device securely in place.

The device consists of an outer shell, an inner tube located within the shell and adapted to receive the lubricant, a plunger being located within the tube and threaded on a screw, the plunger or follower being locked against rotary movement within the tube by virtue of a tongue and groove connection between the plunger and the tube. As illustrated in the drawing the plunger has a groove which engages a tongue pressed into the tube. Hence as the screw is turned the plunger is caused to travel either upwardly or downwardly as may be required, the screw being swiveled in the top of the tube. To the upper extremity of the screw is hinged a sort of lever which may be thrown to a horizontal or vertical position. When in the horizontal position it serves as a lever to operate the screw, and also serves to prevent the cap which is threaded on the outer shell from jarring loose. When, however, it is desired to remove the cap it is only necessary to raise the lever into longitudinal alinement with the screw. The cap may then be removed, since the opening therein is large enough to receive the lever when in the upright position.

The inner tube is connected with a horizontally disposed pin passed through the lower portion of the shell, the tube having angular slots whereby a bayonet joint connection is formed between the tube and the shell, thus locking the tube in place against both rotary and longitudinal movement.

Having briefly outlined my improved construction, I will proceed to describe the same in detail, reference being made to the accompanying drawing in which is illustrated an embodiment thereof.

In this drawing: Figure 1 is a vertical section taken through the hub and journal of the vehicle wheel, the lubricator being shown in section and in place between two spokes of the hub, a tube being passed inwardly from the lubricant receptacle to carry the lubricating material to the journal. Fig. 2 is a section taken on the line 2—2, Fig. 1, being a longitudinal section through the hub of the wheel, the journal being shown in elevation. Fig. 3 is a detail view of the lubricator. Fig. 4 is a detail view in elevation of the inner tube, the screw and plunger being indicated by dotted lines within the tube. Fig. 5 is a horizontal section taken on the line 5—5, Fig. 2, cutting the two spokes between which the device is located. Fig. 6 is a fragmentary view of the lubricator showing its upper portion in elevation, the lever connected with the screw being shown in the upright or extended position, in alinement with the screw with which it is connected. Fig. 7 is a top plan view of the lubricator, or a view looking in the direction of arrow 7, Fig. 6, the horizontal position of the lever being indicated by dotted lines. Fig. 8 is a top view of the lubricant-containing tube.

The same reference characters indicate the same parts in all the views.

Let the numeral 5 designate the hub of a wheel, 6 the journal and 7 the spokes.

The body portion 8 of my improved lubricator is interposed between two of the spokes 7 and will now be described in detail. An outer shell 9 is exteriorly threaded at its upper extremity as shown at 10 to receive an interiorly threaded screw cap 12. To the lower end of the shell is secured a funnel-shaped part 13 tapering downwardly, its lower extremity being exteriorly threaded as shown at 14 to receive the upper threaded extremity 15 of a relatively small tube 16 which passes through an opening 17 formed in the hub, the lower extremity of the tube, which is open-ended, terminating in close proximity to the journal 6, the inner metallic part 18 of the hub being perforated as shown at 19 to receive the inner extremity of this tube. Passed transversely through the lower extremity of the shell is a pin or small bar 20.

Located within the shell 9 is a lubricant-holding tube 21 whose lower extremity is provided with angular slots 22 forming a bayonet joint connection with the pin or bar 20, whereby the said tube is locked against both rotary and longitudinal movement within the shell. The inner extremity of the tube 21 is open, while its upper extremity is provided with a closure 23 within which the upper extremity of a screw 24 is swiveled by means of an interior shoulder 25 formed on the screw and an outer lever 26 applied to its upper protruding extremity 27, the lever being somewhat larger than the opening in the closure. The screw is thus allowed to rotate freely in the closure without turning the tube. The screw cap 12 of the shell is provided with an opening 28 large enough to receive the hinged lever 26 so that the screw cap can be removed when the lever is extended or placed in longitudinal alinement with the screw 24.

Threaded upon the screw within the lubricant tube 21 is a plunger or follower 29 which is hollowed out on its lower surface as shown at 30, its outer portion on its lower side being beveled to form sharp edges, whereby as the plunger travels downwardly in the tube the lubricant is caused to travel inwardly toward the center of the plunger, thus preventing the lubricant from passing the plunger while the latter is traveling downwardly or inwardly for lubricant-ejecting purposes. It is of course desirable that as the plunger moves inwardly or downwardly toward the journal to be lubricated, it shall remove the lubricant from its containing tube as effectually as possible. This follower is prevented from turning in the tube 21 by virtue of a tongue and groove connection between the tube and the plunger, the tube having an inwardly protruding tongue 31 which enters a groove 32 formed in the edge of the plunger.

Preparatory to using the device the lubricant-containing tube is filled with the lubricant to be employed, being a relatively hard substance which will only move toward the axle when forced by the plunger. In order to charge this tube it is necessary that it shall be removed from the shell in which it is normally contained. In order to remove it the lever 26 is thrown to a position in longitudinal alinement with the screw. The screw cap 12 of the outer casing is then removed, and the tube 21 given a partial turn, whereby the horizontal portion of its slots 22 is disengaged from the bar or pin 20. The tube may then be pulled straight out of the shell by using the lever 26 as a handle. Preparatory to charging the tube 21 it is of course necessary that the follower should be raised to the top of the tube in order that the latter may receive a full charge of the lubricating material. When this is done the tube is pressed into a body of hard lubricant with its open extremity foremost. In this way the tube may be filled with the lubricating material. It is then reinserted in the shell, and interlocked with the bar 20 by employing the bayonet joint connection heretofore described. The screw cap 12 is then applied to the shell, after which the lever 26 is thrown to a horizontal position, being that shown by full lines in Figs. 3 and 4 and by dotted lines in Fig. 7. In order to force the lubricant from its receptacle, it is only necessary to turn the screw, using the lever when in its horizontal position. As the screw is rotated the plunger is caused to travel downwardly thereon, since it is locked against turning in the tube as heretofore explained. In this manner the lubricant is forced out of its receptacle, downwardly through the small tube 16, and delivered to the journal 6.

In case the lubricant is particularly hard, as in cold weather, the inner tube may stick against turning in order to release it from its bayonet joint connection with the bar 20 of the shell. In case this difficulty arises, a nail 34 may be inserted in an opening 33 formed in the top or closure 23 of the tube 21 near the outer edge of the latter. Before introducing the nail, the lever 26 should be thrown down over this hole. As the lever is U-shaped, the nail may be then passed into the hole through the arms of the lever. Then by using the lever in connection with the nail the tube may be easily turned for the purpose of disconnecting its angular slots 22 from the bar or pin 20. The tube may then be moved straight out of the shell by employing the lever as a handle.

The upper portion of the lubricant-containing tube 21 is provided with a small opening 35 located just below the plunger when the latter is at its upward limit of movement. The object of this opening is to allow the air to escape from the tube during the operation of charging or filling the latter with lubricant.

As illustrated in the drawing, the lubricator is connected with one of the spokes 7 by a band 36 composed of two parts 37 and 38 passed respectively around one of the spokes and the shell of the device. These two parts are connected intermediate the spoke and the device by a bolt 39, which is fastened by a nut 40.

The opening 28 in the top of the cap 12 is slightly elongated or extended in one direction as shown at 41, to allow the pivoted lever to be pushed from the full line position to the dotted line position in Fig. 7. The object of this is to make room for the portion 26ª of the lever below the pivot. Hence when the lever is in the horizontally disposed or locking position, by giving it a slight turn so that it shall be out of alinement with the extension 41 of the opening, it cannot accidentally change its postion. In other words, it is locked to prevent it from being raised into alinement with the screw, and can only be so actuated by turning it again to the proper position.

Having thus described my invention, what I claim is:

1. In a lubricator, the combination with an outer shell equipped with a screw cap at one extremity and a relatively small discharge conduit at its opposite extremity, a lubricant-containing tube inserted in the shell and detachably connected therewith to lock the tube in place, a screw journaled in the lubricant receptacle and having a pivoted lever protruding beyond its outer extremity, which is closed, a plunger threaded on the screw within the lubricant receptacle and interlocked with the latter to prevent rotary action while allowing longitudinal movement, the screw cap applied to the outer extremity of the shell and having an opening through which the outer extremity of the screw protrudes, the said opening being large enough to receive the said lever when the latter is in longitudinal alinement with the screw.

2. A lubricator comprising a shell having a detachable cap at its outer extremity and a relatively small lubricant-discharge conduit at its opposite extremity, a lubricant-containing tube located within the shell and interlocked with the latter by means of a bayonet joint connection, the shell being equipped with a transverse bar near its inner extremity for the purpose, a screw journaled in the tube and having a plunger threaded thereon and located within the tube, a tongue and groove connection between the tube and the plunger to prevent rotary movement of the plunger within the tube while allowing the plunger to travel in the direction of the axis of the tube, the cap of the shell having an opening and the screw having a pivoted lever protruding beyond the tube and adapted to pass through the opening in the top of the shell when the lever is in longitudinal alinement with the screw, the lever being adapted to be thrown into a position at an angle with the screw, to operate the latter for the purpose of causing the plunger to travel in the tube, substantially as described.

3. A lubricator comprising a relatively stationary shell having a detachable cap at its outer extremity, a lubricant-containing tube located within the shell, the same being open at its inner extremity and closed at its outer extremity, the said tube being interlocked with the shell, a screw journaled in the tube, a plunger threaded on the screw within the tube, the plunger being connected with the tube to permit longitudinal movement on the screw, but preventing rotary action within the tube, the screw having its outer extremity protruding beyond the tube and passing through an opening formed in the cap of the shell, the outer extremity of the tube having a hole, and the lever being bifurcated to straddle the said hole, whereby a nail may be inserted between the arms of the lever and into the hole for the purpose of turning the tube within the shell, for the purpose set forth.

4. The combination with a relatively stationary shell open at its outer extremity, of a lubricant-containing tube inserted therein and interlocked therewith by a bayonet joint connection, a screw journaled in the outer extremity of the tube, which is closed, the outer extremity of the screw protruding beyond the closure of the tube and having a bifurcated lever pivotally connected with its outer end, the closure of the tube having an opening near its outer edge, to receive a nail adapted to be inserted in the said hole between the arms of the lever to facilitate the turning of the tube within the shell, for the purpose set forth.

5. The combination with a vehicle wheel, of a lubricator comprising a shell interposed between two spokes of the wheel and suitably connected to maintain its position, a lubricant containing tube inserted in the shell and interlocked therein, a screw journaled in the tube and protruding beyond the outer extremity of the tube, a lever pivotally connected with the outer extremity of the screw, a follower threaded on the screw and interlocked with the tube to permit longitudinal movement of the screw but preventing rotary action, the outer extremity of the shell having an opening through which the outer extremity of the screw protrudes, the said opening being large enough to receive the lever when the latter is in longitudinal alinement with the screw, a lubricant discharge conduit connected with the shell and passing through the hub of the wheel and terminating in suitable proximity to the axle of the journal, substantially as described.

6. A lubricator comprising a relatively stationary shell having a detachable cap at its outer extremity, a lubricant-containing tube located within the shell, the same being open at its inner extremity and closed at its outer extremity, a screw journaled in the tube, a plunger threaded on the screw within the tube, the screw having its outer extremity protruding beyond the tube and passing through an opening formed in the cap of the shell, and a lever pivoted to the outer extremity of the screw and adapted to occupy a position in alinement with the latter, the opening in the cap being of such size as to permit the removal of the latter when the lever is in alinement with the screw, the opening in the cap being elongated in one direction to make room for the portion of the lever extending below its pivot, this extension of the lever being such as to prevent its movement from one position to another except when properly adjusted, substantially as described.

7. The combination with a vehicle wheel, of a lubricator comprising a lubricant containing tube interposed between two spokes of the wheel and suitably connected to maintain its position, a screw journaled in the tube and protruding beyond the outer extremity thereof, a lever pivoted to the protruding extremity of the screw, a follower threaded on the screw and interlocked with the tube to permit longitudinal movement of the screw and prevent rotary action, the outer extremity of the tube having an opening through which the outer extremity of the screw protrudes, the said opening being large enough to receive the lever, when the latter is in alinement with the screw, and a lubricant discharge conduit connected with the tube and passing through the hub of the wheel and terminating in suitable proximity to the journal of the axle.

In testimony whereof I affix my signature in presence of two witnesses.

RICHARD H. VESEY.

Witnesses:
J. R. McKercher,
G. E. Boughner.